UNITED STATES PATENT OFFICE.

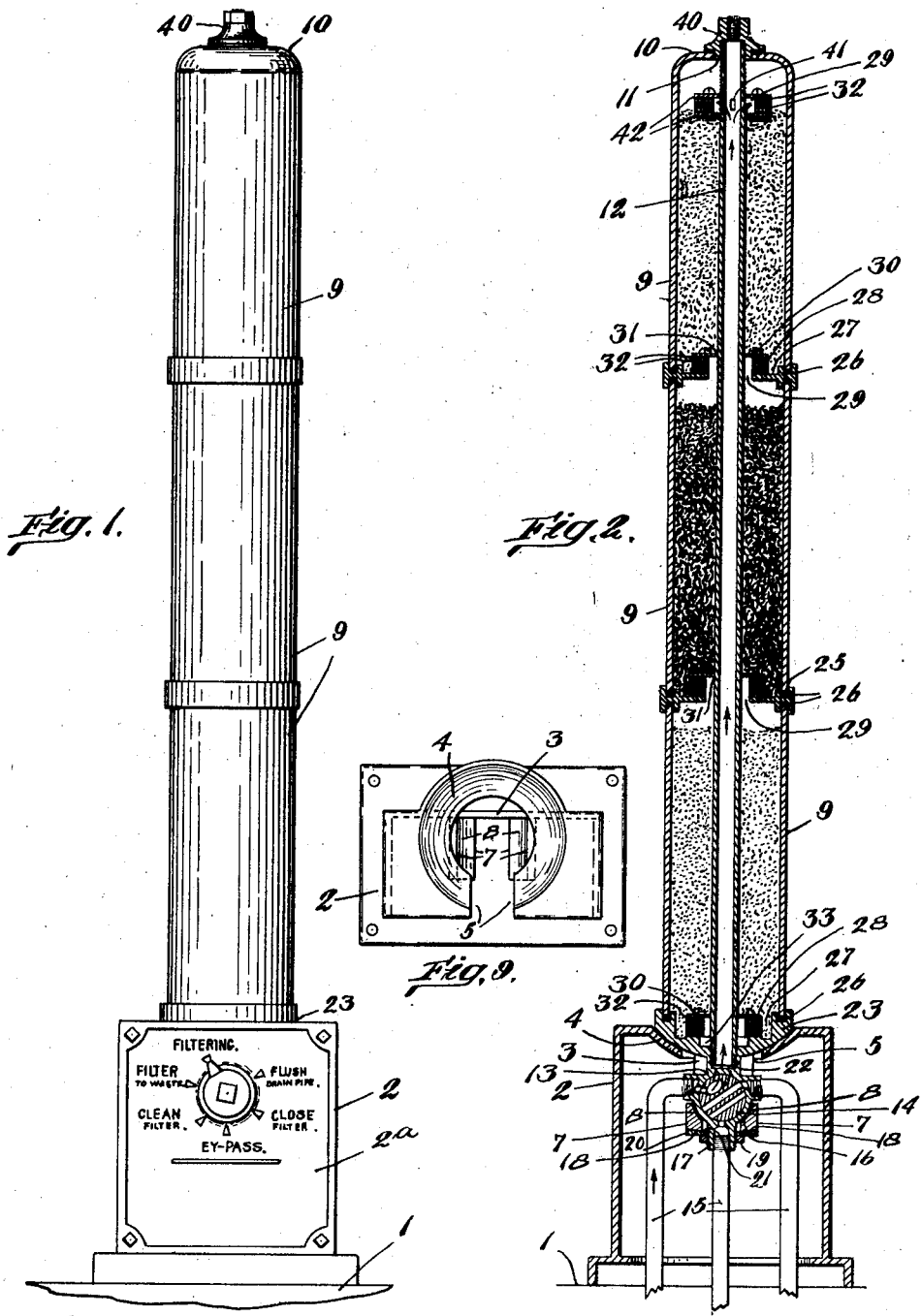

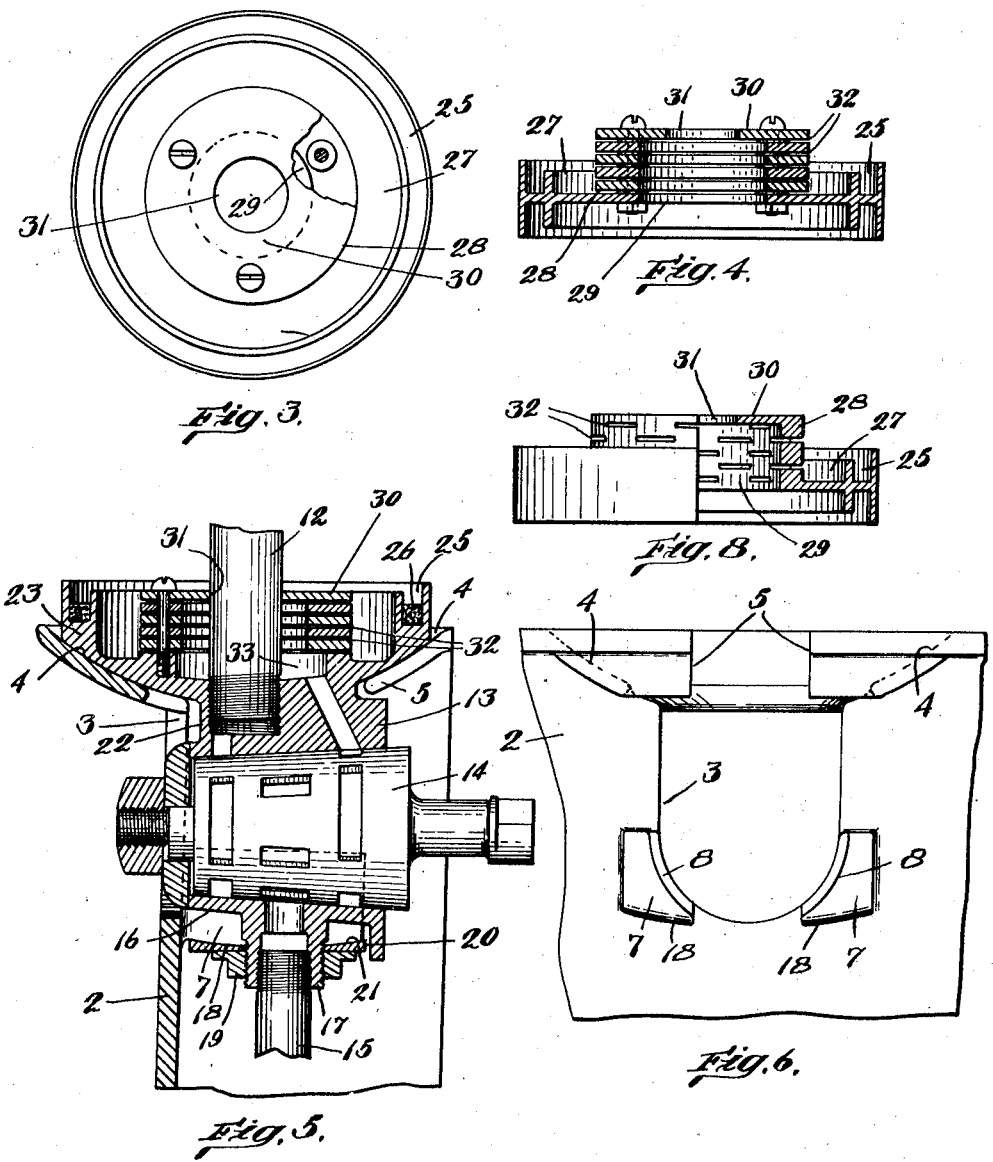

LOUIS J. STERN, OF BOSTON, MASSACHUSETTS, ASSIGNOR TO EDWARD R. TOLFREE, OF BOSTON, MASSACHUSETTS.

WATER-FILTER.

1,339,045.  Specification of Letters Patent.  Patented May 4, 1920.

Application filed October 18, 1916. Serial No. 126,403.

*To all whom it may concern:*

Be it known that I, LOUIS J. STERN, a citizen of the United States, residing at Boston, in the county of Suffolk and State of Massachusetts, have invented an Improvement in Water-Filters, of which the following is a specification.

The invention relates to an improvement in filters of that type designed to have more or less permanent connection with a water supply under pressure, as for example a city service pipe, so that the filters may be connected in the service pipe system throughout a factory or similar structure with a view to providing filtered water for drinking and other purposes.

The improved filter is of the self-cleaning type, provision being made for reversing the flow of water from the service pipe through the filter at will, the discharge being connected with a waste outlet, and the reversal of the fluid for cleansing as well as other controlling functions connected with the filter, which particularly adapts it for the service noted, is through a suitably controlled valve with which the present invention is concerned.

The filter of this invention comprises either one chamber or a series of superimposed chambers, each having its own filtering media, the said chambers being independent one from another and arranged in column forming relation.

As the chambers are independent and arranged in column forming relation, provision must be made for supporting and connecting the said chambers in such superimposed relation, and a water-tight connection between the chambers, including the separation of the filtering material and the provision for the passage of water from one to another chamber, constitutes one of the objects of the present invention.

The disposition of the filtering chambers in superimposed relation contemplates the use of gravity in addition to the service pressure in forcing the water through the filtering medium in the filtering operation, and further in maintaining the filtering medium in properly compact condition for filtering purposes, and as a filter of this type, including the self-cleansing feature, must of necessity have a means closed against the chambers except at the extreme upper end for delivering the water to be filtered to such upper end, and for receiving the cleansing water at such upper end. Another object of the invention resides in the use of a filter supply pipe, which extends throughout the length of the filtering chambers and also serves as a means for supporting the column of filtering chambers in conjunction with the connecting and separating elements, and the use of such supply pipe, in connection with an additional element for rigidly securing the filtering chambers in proper sealing relation to the connecting and separating elements, as a unit, in column forming relation, this particular function of the supply pipe facilitating the connection of the chambers in complete filter formation or for the convenient separation and removal when it is necessary to have access to the interior of the chambers.

The column filter of this invention may be employed as an addition to a receptacle, in which latter there is provided a means for cooling the filtered water prior to its delivery to a particular outlet, and while such receptacle forms no particular part of the present invention, there is required a connection between such column and receptacle as will insure a proper fixed relation between the parts for the most effective service of the filter, and therefore another of the objects of the present invention is a provision of means whereby the filter, as an entirety, may be readily connected to such receptacle, the construction of such means permitting adjustment of the filter column with respect to the receptacle, in order that the filter column may be supported in true vertical relation to the receptacle, to insure an even distribution of the fluid throughout the filtering medium, during the filtering or cleansing operation in case the receptacle is not horizontally arranged.

Figure 1 is a view in elevation showing the filter proper, the receptacle on which the filter proper is supported being shown in broken lines.

Fig. 2 is a longitudinal vertical sectional view of the same.

Fig. 3 is a plan of one of the connecting and separating elements.

Fig. 4 is a vertical central sectional view of the same.

Fig. 5 is an enlarged vertical sectional view, showing the mounting of the filter column, with relation to the housing supported on the receptacle and inclosing the controlling valve and connected pipes.

Fig. 6 is a broken view in elevation showing the housing with its front plate removed.

Fig. 7 is a sectional view of the locking plate for the filter mounting.

Fig. 8 is a modified form of connecting and separating element.

Fig. 9 is a plan view of the housing.

The improved filter considered as an entirety, contemplates the use of a receptacle 1, preferably provided with cooling-means, into which the filtered water is delivered, which receptacle will have connected with it a suitable dispensing device, not shown.

Erected on the receptacle, is a housing 2, having an opening at its front side adapted to be closed by a front plate 2ª, and having an opening 3 at its rear side, adapted to permit the assemblage and disassemblage of the lower end-portion of the filter proper with the housing and receptacle. The top of the housing 2 is formed to provide a circular concaved seat 4, and has a recess 5 extended inward from its front edge to and including the center of the seat, said opening 5 being in open communication with the front opening of the housing. Said seat extends rearward beyond the top of the rear wall of the housing, see Fig. 9. The rear wall of the housing 2 has seat lugs 7, 7, see Figs. 5 and 6, arranged immediately below the lower margin of the opening 3, said lugs projecting inwardly from the rear wall and terminating short of the forward edge of the housing. Said lugs 7 are spaced apart and their proximate surfaces 8, 8, are concave, see Fig. 6, preferably corresponding with the adjacent edge of the opening 3.

The filter proper comprises one or more chambers, in this instance three being shown, arranged one above the other, each chamber comprising essentially a cylindrical hollow member 9. Each of the said members is open at both ends, except the uppermost member, which is closed by an end-portion 10, which may be integrally formed. Said end-portion 10 has an aperture 11, of a size to receive a clamp-nut 40 into which the upper end of a filter supply pipe 12 is secured. The filter supply pipe rises from a casing 13, of a controlling valve 14, which is arranged in the housing 2, and extends upward through all of the filtering chambers, and is centrally disposed. The controlling valve is of conical formation and together with its casing 13, is formed with suitable ports and passages whereby the functions of the filter, as hereinafter set forth, may be obtained. The casing 13 is formed for the connection thereto of a plurality of pipes 15, which are adapted to be separately called into service by a proper adjustment of the valve. The valve, in its specific formation, forms no part of the present invention, and I am not concerned with this particular structure except in so far as said casing is adapted for connection in the mounting of the housing just described. For this purpose the lower portion of the casing is rounded, as at 16, to occupy a position between lugs 7, and has a nipple 17, which may, and preferably does, form a pipe connection, said nipple depending from the lower portion of the casing, and being of a length to extend below the seat lugs. The lower end-portion of the nipple 17 is exteriorly threaded to receive a clamping nut 19, and a washer 20, which latter is formed with a central opening to engage over the nipple. The washer 20 has a concaved upper surface 21, and a flat under surface, the concaved surface 21 engaging the under side of the seat lugs, which latter are curved, as at 18, thus adapting them to receive the washer. It is thus apparent that so far as the connection of the valve-casing with the seat lugs is concerned, said casing may be shifted in any direction, within the limits of said lugs and locked in such position by the nut 19, the washer permitting the nut to snugly hold the parts in their adjusted relation. Adjustment of the valve-casing and parts supported by it, as will be described, is very desirable, to enable the filtering elements to occupy a vertical position, although the receptacle and housing may be canted, owing to any irregularity of the plane of the floor. Integral with the valve casing, and connected thereto, by a short narrow neck 22, is the filter base 23, having a hemispherical lower surface to fit upon the seat 4 in the top of the housing. As the filter base 23 supports the column filter and as this base has a hemispherical end and is mounted in a correspondingly formed seat, it is obvious that adjustment of this integral valve casing may be readily accomplished and the parts locked in fixed relation to the housing after such adjustment.

The filter supply pipe 12 is threaded or otherwise connected in the valve-casing 13, and adapted to communicate with a port therein, which is under control of the valve, and rises through the base 23 to a height necessary to extend through all of the filter chambers, and has delivery openings at its upper end.

There are arranged between the adjacent ends of the respective filter chambers, a connecting and separating member formed to direct the water from one chamber to another, to maintain the proper relation of the filter chambers with the filter supply pipe, to separate the chambers in so far as the filtering material is concerned, and further to interconnect the respective chambers so as to form a water-tight connection therebetween. These connecting and separating members are illustrated more particularly in Figs. 3 and 4, although it will be apparent particularly from Fig. 5, that the filter base 23 is in its essential formation, similar to that of the connector, as its functions of securing the lowermost chamber to the base in water-tight relation and at the same time providing for direct control of the fluid, is practically identical with that of the remaining connecting and separating members. Considering the base and connecting and separating members collectively they each provide an annular space 25 to receive packing 26, said space being of a transverse dimension practically coextensive with the thickness of the wall of the filtering chambers 9. Inwardly of the packing space 25 there is formed an additional open space 27, this space 27 being annular. Inwardly of the space 27 the base, as well as the connecting and separating members, is formed with an annular wall 28 having a central opening 29 of a diameter exceeding the diameter of the supply pipe 12. The opening 29 extends but part way through the annular wall vertically, leaving a plate portion 30 to close the upper end of the space or channel 29. The plate 30 is centrally formed with an opening 31, which accurately receives the filter supply pipe 12. The annular wall beyond the opening 29 is formed with a series of transverse or horizontal ports or passages 32, these being comparatively minute, and forming the sole communication between the outer channel 27, and inner channel 29 of the particular part.

In Fig. 4, the annular wall 28 is composed of a plurality of plates superimposed and connected together by screws, there being washers arranged about the screws which slightly separate the plates to provide water passages and establish open communication for the water between the chambers, thus forming a hollow boss. In Fig. 8, the annular wall 28 is formed integral with the remainder of the element, and has narrow transverse slots to provide water passages.

So far as described the connecting and separating members and base are identical, the base being additionally, however, provided with an open chamber 33, below and in open communication with the channel 29, from which channel valve controlled port or ports are arranged to lead. The connecting and separating members in addition to the details described, differ from the base in that they are, so far as their connection with the filter chambers is concerned, formed double, in order that they may coöperate with the meeting ends of adjacent filtering chambers. For example, as shown in Fig. 4, the annular webs forming the recess 25, are extended above and below the main transverse plate of the member so that said channels 25 are duplicated above and below said main plate to thus receive the adjacent ends of neighboring filter chambers, it being understood that the seating medium 26 is arranged in both of said channels.

The filtering chambers are arranged in superimposed relation, the lowermost chamber having its lower edge arranged on the packing 26 in the recess 25 of the filter base. A connecting and separating member is then arranged upon the upper end of said chamber, the member being moved to this position by being slid endwise over the filter supply pipe. The second filter chamber is then applied with its lower end in the uppermost recess 25 of said member. The structure is built up in this way until the desired number of filtering chambers have been employed. The uppermost chamber, which, as previously stated, is closed except for an opening for the passage therethrough of the supply pipe, is secured in place by a clamp-nut 40 which engages the threaded upper end of the supply pipe 12. The action of the nut 40 binds all of the filtering chambers in position and in such pressure contact with the sealing strips of the respective connecting and separating members as to provide, in effect, an unbroken vertical column.

The filter supply pipe 12 is formed near the upper end of the uppermost filter chamber with outlets 41, and arranged on the supply pipe, at the top of the filtering material contained in said chambers, is a fluid director 42, which is identical with the connecting and separating member, except the provision of flanges and recesses for the reception of the ends of the filtering chambers. In other words the fluid director at the upper end of the supply pipe is constructed to provide the annular wall 28 transversely slitted, as at 32, the inner channel 29 of a diameter exceeding that of the supply pipe and the upper plate 30 closing the channel 29 at the upper end and formed with the opening 31 to permit the passage of the supply pipe therethrough. The fluid director 42 is arranged upon the pipe 12 so that the openings 41 in said pipe are in open communication with the channel 29 of such director. The filtering chambers are adapted to separately contain proper filtering media and for the best results as suggested by experience, I prefer, in the use of three such chambers to arrange in the upper and lower chambers a filtering medium that will cleanse the water of matter held in suspension, as for example, sand, or quartz, and to arrange in the intermediate compartment or chamber a medium that will deodorize, decolorize, and cleanse, such as carbon. The connecting and separating members act to separate the material of one chamber from another, and in the filtering operation the water is first subjected to the action of the sand in the upper chamber, then the carbon in the intermediate chamber, and then the sand in the lower chamber. In the reversal of the operation or cleansing, the water is directed through the filtering media, and after traversing such filtering media passes into the supply pipe 12, through the opening 41, and down said pipe to the waste. In this connection, I prefer that the quantity of filtering media in each chamber be such that a space is left at the upper end of the chamber. This permits a rapid cleansing action of the filter media, as the flow of water therethrough in cleansing operation, under pressure, will by reason of such space, be permitted to raise and stir up the filtering media to rapidly induce that attrition necessary for cleansing.

The filtering column, as a whole, is applied to the housing, the valve casing with contained valve being passed down through the openings in the upper wall or rounded base of the housing until the rounded portion of the casing rests upon the lugs 7. The column, as an entirety may, by the mounting described, be readily moved on the rounded base 4 and on the lugs 7, to a position to insure an absolutely vertical relation of the column with respect to the receptacle 1, the parts being locked in such adjusted relation by the nut 19. The rear portion of the valve casing extends through the opening 3 in the rear of the housing, while the forward portion of the valve, which is in the form of a non-circular head, extends through an opening in the cover plate 2ª, adapted to close the open front of the housing. The valve is thus operated from beyond the housing and the cover plate is preferably marked to indicate a particular function in a particular position of the valve, as shown in Fig. 1.

The direction of flow of the fluid is apparent from the description and from the illustration of Fig. 2, it being understood that in filtering the valve is so operated that the fluid is delivered through the supply pipe, finding its way through the openings 41, into the channel 29 of the fluid director 42, through the passages 32 thereof, the filtering media in the upper chamber, the minute passages 32 of the uppermost connector, the channel 29 thereof, the filtering media in the lower chamber, and so on. In the cleansing operation, the fluid passes through the filtering media of the lower chamber, and passes into a channel 29 of the base, the minute passages 32, the channel 27, the filtering media in the lowermost chamber, and so on, finally finding its way into the ports 41, and downwardly through the supply pipe to the waste.

I claim:—

1. A column filter having a plurality of superimposed chambers, each adapted to contain filtering material and having unoccupied spaces at the top, connecting and separating means interposed between said chambers above the unoccupied spaces having centrally disposed bosses with horizontally arranged fluid passages in their side walls, means extending through the column for supplying water to be filtered at the top of said column, which fluid flows through the several chambers, and means for reversing the flow of water through the several chambers.

2. A column filter having a plurality of superimposed chambers, each adapted to contain filtering material, a flat separating member having an annular recess for a sealing strip, and a centrally-located opening therethrough, a series of flat rings disposed upon said member in vertically-spaced relation to each other having openings registering with said central opening, and a pipe extended through the openings in said members and rings for delivery of fluid to the top chamber.

3. A column filter having a plurality of superimposed chambers, each adapted to contain filtering material, a flat separating member having an annular recess for a sealing strip, and having a centrally-disposed annular opening, a hollow boss disposed upon said member with its opening registering with said annular opening, said boss being formed of a series of flat rings maintained in vertical spaced relation with each other to form water passages, and a pipe extended through the openings in said members for the delivery of fluid to the top chamber.

4. A filter including a plurality of superimposed filtering chambers forming a column, end caps arranged on the ends of said column, a fluid supply pipe extended through the chambers comprising said column, said end caps being secured to the ends of said pipe to thereby secure the separate chambers into one integral filtering column, one end of said fluid supply pipe being in communication, through an end cap, with a source of fluid supply, the other end of said pipe being closed by its end cap, said pipe having a fluid opening therethrough below its closed end adjacent the end cap, and a fluid distributer arranged about said fluid opening, comprising two spaced-apart end plates disposed in fluid tight fit on said supply pipe with the fluid opening therebetween, and a series of superimposed spaced-apart flat plates arranged about said pipe between said end-plates to form passages therebetween for the flow of fluid from the pipe into the top filtering chamber.

5. A water filter having a central supply pipe and a plurality of connecting filtering chambers, substantially flat connecting and separating members therefor, said members each having a central circular hole, the diameter of which is greater than that of the supply pipe whereby fluid may flow through said connecting and separating members along said supply pipe into an adjacent chamber, a top-plate having a centrally disposed circular hole therein into which said supply pipe fits in fluid tight relation therewith and on an intermediate portion of which said top-plate is arranged, said top-plate spaced above said connecting and separating member, and a plurality of plates, each having a central opening larger than said pipe whereby water may flow between said plates and supply pipe, arranged about said pipe in spaced-apart relation between said connecting and separating member and said top-plate to form a distributer through which fluid communication is established between two adjacent chambers.

In testimony whereof, I have signed my name to this specification, in the presence of two subscribing witnesses.

LOUIS J. STERN.

Witnesses:
B. J. NOYES,
H. B. DAVIS.